(12) United States Patent
Lian et al.

(10) Patent No.: US 9,664,829 B2
(45) Date of Patent: May 30, 2017

(54) COLOR FILTER

(71) Applicant: Au Optronics Corporation, Hsinchu (TW)

(72) Inventors: Shiang-Lin Lian, New Taipei (TW); Chien-Kai Chen, Taipei (TW); Ciou-Yin Chen, New Taipei (TW); Chen-Hsien Liao, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 198 days.

(21) Appl. No.: 14/583,804

(22) Filed: Dec. 29, 2014

(65) Prior Publication Data
US 2015/0346406 A1 Dec. 3, 2015

(30) Foreign Application Priority Data

May 30, 2014 (TW) .............................. 103119061 A

(51) Int. Cl.
*G02B 5/23* (2006.01)
*G02B 5/22* (2006.01)
*G02B 1/04* (2006.01)
*G02B 5/20* (2006.01)
*G02F 1/1335* (2006.01)
*G03F 1/00* (2012.01)

(52) U.S. Cl.
CPC ................. *G02B 5/23* (2013.01); *G02B 1/04* (2013.01); *G02B 5/201* (2013.01); *G02B 5/223* (2013.01)

(58) Field of Classification Search
USPC ............... 252/301.16, 301.35, 586; 349/106; 359/891, 892; 430/7, 270.1, 281.1
See application file for complete search history.

(56) References Cited

FOREIGN PATENT DOCUMENTS

| CN | 103176357 | 6/2013 |
|---|---|---|
| CN | 102565906 | 1/2014 |
| TW | I317050 | 11/2009 |
| TW | 201333545 | 8/2013 |
| WO | WO 2013/094828 A1 * | 6/2013 |

OTHER PUBLICATIONS

Peter T. Burks, Alexis D. Ostrowski, Alexander A. Mikhailovsky, Emory M. Chan, Paul S. Wagenknecht, and Peter C. Ford,Quantum Dot Photoluminescence Quenching by Cr(III) Complexes. Photosensitized Reactions and Evidence for a FRET MechanismJ. Am. Chem. Soc. 2012, 134, 13266-13275. © 2012 American Chemical Society.*

* cited by examiner

*Primary Examiner* — Bijan Ahvazi
(74) *Attorney, Agent, or Firm* — Jianq Chyun IP Office

(57) ABSTRACT

A color filter including a substrate and a red filter pattern is provided. The red filter pattern is disposed on the substrate, wherein the red filter pattern includes a red dye and a fluorescence quencher.

11 Claims, 4 Drawing Sheets

COLOR FILTER

CROSS-REFERENCE TO RELATED APPLICATION

This application claims the priority benefit of Taiwan application serial no. 103119061, filed on May 30, 2014. The entirety of the above-mentioned patent application is hereby incorporated by reference herein and made a part of this specification.

BACKGROUND OF THE INVENTION

1. Field of the Invention

The invention generally relates to a color filter, and more particularly, to a color filter having a red filter pattern.

2. Description of Related Art

Liquid crystal display (LCD) panels have advantages of thin thickness, high resolution, low power consumption, and no radiation, and thus have become the mainstream of flat display apparatuses. Generally, an LCD panel is constituted by a backlight module and a LCD panel, wherein the LCD panel usually includes a pixel array substrate, a liquid crystal layer and a color filter.

Traditionally, the color filter includes a substrate, a black matrix and a color filter layer. A commonly known color filter layer includes a plurality of color filter patterns, such as a red filter pattern, a green filter pattern and a blue filter pattern. However, with the rising demands for screen brightness and color saturation, how to increase the transmittance and the contrast ratio of the color filter has become an issue for related industry.

SUMMARY OF THE INVENTION

An embodiment of the invention provides a color filter including a red filter pattern which has a red dye and a fluorescence quencher.

The color filter of the embodiment of the invention includes a substrate and a red filter pattern. The red filter pattern is disposed on the substrate, wherein the red filter pattern includes a red dye and a fluorescence quencher.

In an embodiment of the invention, a color filter includes a substrate and a red filter pattern. The red filter pattern is disposed on the substrate, wherein the red filter pattern has a bright state transmittance spectrum and a dark state transmittance spectrum. A transmittance ratio of the bright and dark contrast spectrum is derived from the bright state transmittances spectrum divided by the dark state transmittance spectrum. The transmittance ratio of the bright and dark contrast spectrum has a first characteristic peak and a second characteristic peak. A wavelength range of the first characteristic peak is from 380 nm to 480 nm, and a wavelength range of the second characteristic peak is from 580 nm to 780 nm. A sum of the transmittance ratio of the bright and dark contrast spectrum of the first characteristic peak is Y1, a sum of the transmittance ratio of the bright and dark contrast spectrum of the second characteristic peak is Y2, and Y2/Y1 is less than 3.9.

In view of the above, the color filter of the embodiment of the invention includes the red filter pattern, and the red filter pattern includes the red dye and the fluorescence quencher, thereby being facilitative in increasing transmittance and the contrast ratio of the color filter.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
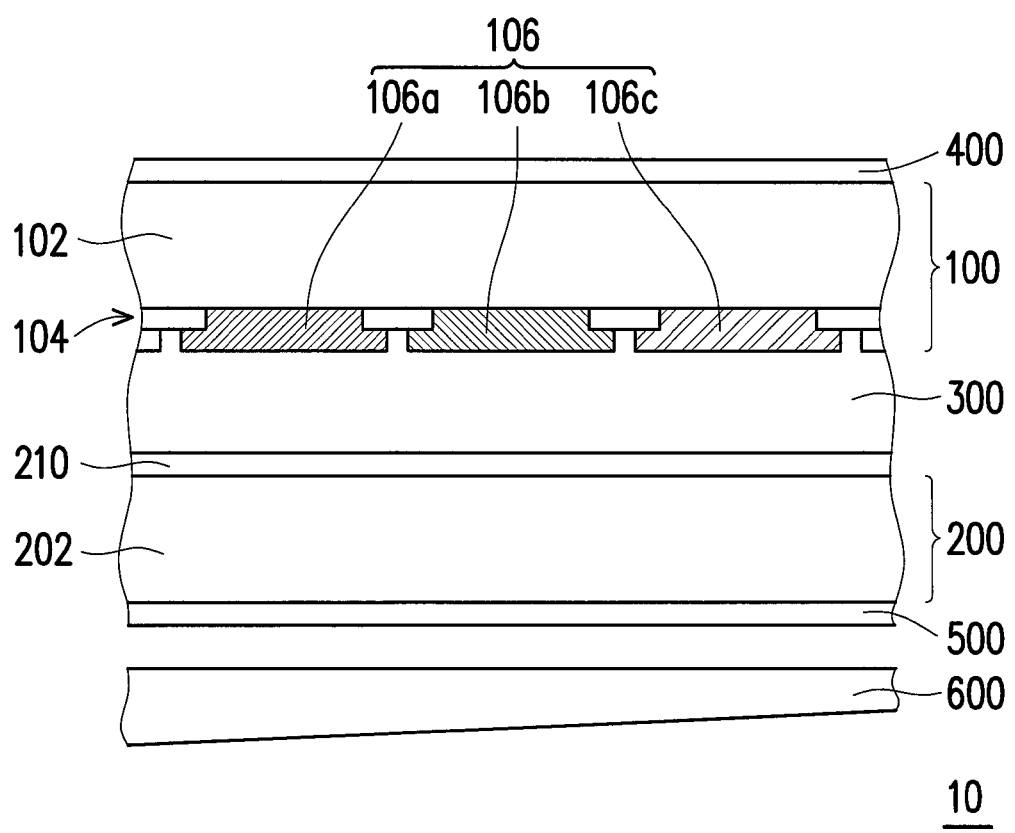
FIG. 1 is a schematic cross-sectional view illustrating a display panel according to an embodiment of the invention.
Figure 2:
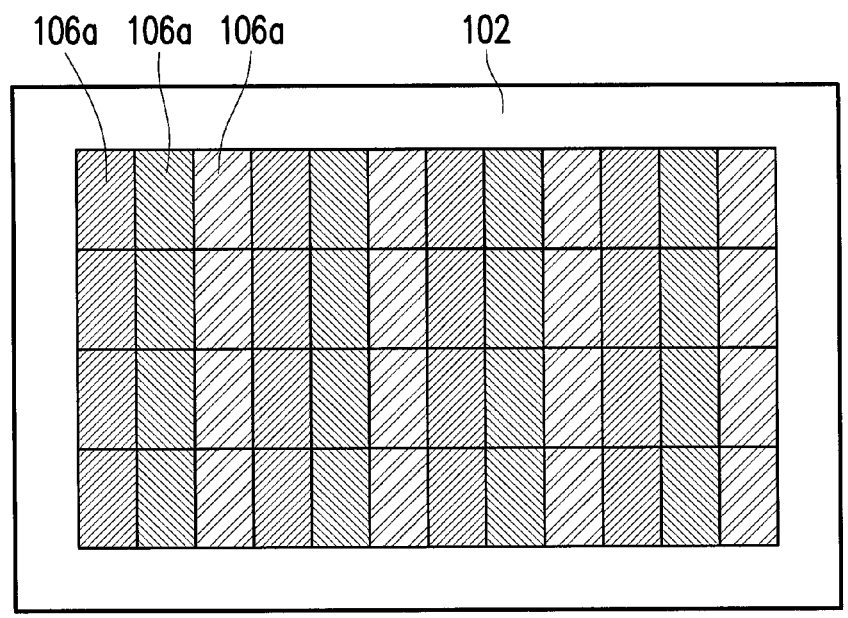
FIG. 2 is a schematic view illustrating a color filter of the display panel according to the embodiment of the invention.
Figure 3:
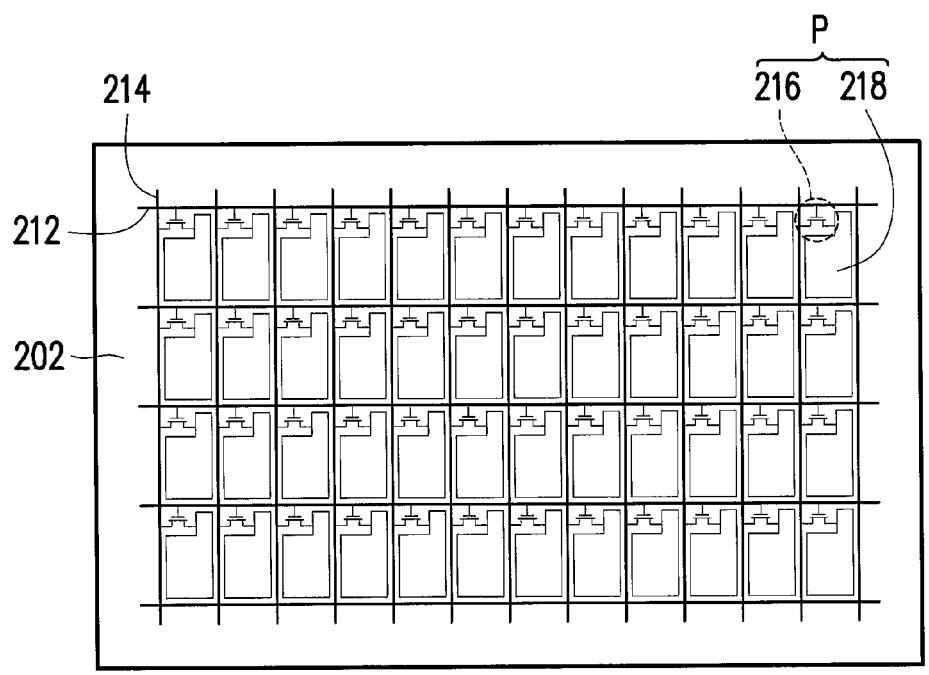
FIG. 3 is a schematic view illustrating a pixel array substrate of the display panel according to the embodiment of the invention.

FIG. 1 is a schematic cross-sectional view illustrating a display panel according to an embodiment of the invention. FIG. 2 is a schematic view illustrating a color filter of the display panel according to the embodiment of the invention. FIG. 3 is a schematic view illustrating a pixel array substrate of the display panel according to the embodiment of the invention. Referring to FIG. 1, FIG. 2 and FIG. 3 at the same time, a display apparatus 10 includes a display panel. The display panel includes a color filter 100, a pixel array substrate 200, a display medium layer 300, a first polarizer 400, and a second polarizer 500. The display apparatus 10 further includes a backlight module 600 disposed at a side of the display panel.

The color filter 100 and the pixel array substrate 200 are disposed opposite to each other. The display medium layer 300 is located between the color filter 100 and the pixel array substrate 200. The first polarizer 400 is disposed at a side of the color filter 100 that is away from the pixel array substrate 200. The second polarizer 500 is disposed at a side of the pixel array substrate 200 that is away from the color filter 100. The backlight module 600 and the pixel array substrate 200 are disposed at two opposite sides of the second polarizer 500. The backlight module 600 is configured to provide a plane light source to the display panel.

The color filter 100 includes a substrate 102, a light-shielding layer 104 and a color filter layer 106. The substrate 102 is generally a transparent substrate, which includes glass, quartz, organic polymer or other suitable material.

The light-shielding layer 104 is disposed on the substrate 102. The light-shielding layer 104, for example, is a black matrix, which has a plurality of pixel openings and may be formed by light-shielding materials. The light-shielding layer 104 is configured to shield elements or traces in the display panel 10 that not intended to be viewed by a user.

The color filter layer 106 is disposed on the substrate 102. The color filter layer 106 has a plurality of color filter patterns, and the color filter patterns are respectively disposed in one of the pixel openings of the light-shielding layer 104. According to the present embodiment, the color filter layer 106 may include a first color filter pattern 106a, a second color filter pattern 106b and a third color filter pattern 106c, wherein at least one of the above is a red filter pattern. For instance, in the present embodiment, the first color filter pattern 106a may be a red filter pattern, the second color filter pattern 106b may be a green filter pattern, and the third color filter pattern 106c may be a blue filter pattern, but the invention is not limited thereto. In other embodiments, the red filter pattern may also be matched with filter pattern of other colors, and it all depends on a designer's needs.

Specifically, the red filter pattern 106a includes a red pigment, a red dye and a fluorescence quencher. In the red filter pattern 106a, the content ratio of the red pigment is approximately 44.6% by weight, the content ratio of the red dye is approximately 0.45% by weight, and the content ratio of the fluorescence quencher is approximately 0 to 0.09% by weight. In the present embodiment, a weight ratio between the content of the red dye and the content of the fluorescence quencher is approximately 10:1 to 5:1, and all the said ratios are scaled in weight percentages. The red pigment is, for example, a pigment of Model R254 or R177, so that an incident light, after passing through the red pigment, may at least allow light within a wavelength range of red light (i.e., 570 nm to 750 nm) to pass through, and the red pigment does not produce fluorescence after absorbing the light. The pigment of Model R254 or R177 mentioned above is merely provided as an example, and the invention is not limited thereto.

The red dye is, for example, a dye capable of producing fluorescence after absorbing the light. In detail, the incident light, after passing through the red dye, may at least allow light within the wavelength range of red light to pass through, and at the same time, the red dye may produce fluorescence after absorbing the light. The red dye is, for example, a xanthene class dye or an acid red dye. For instance, the red dye is a structure as represented by formula 1 or formula 2 below.

Formula 1

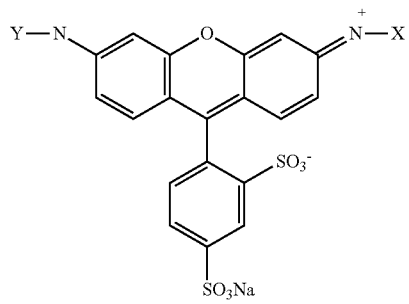

Wherein, X and Y are each independently alkyl.

Formula 2

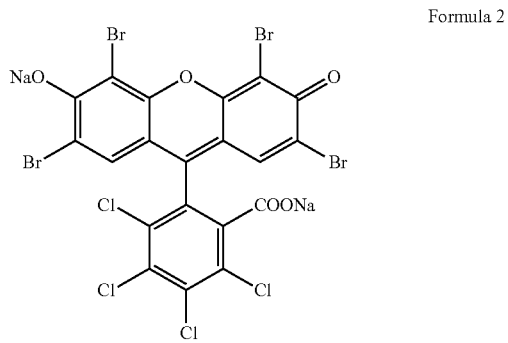

The fluorescence quencher includes trivalent chromium complexes or pentavalent chromium complexes. For instance, the fluorescence quencher may be trans-(1,4,8,11-tetraazacyclo-tetradecane)dichlorochromium(III), trans-(1,4,8,11-tetraazacyclo-tetradecane)dinitritochromium(III) or trans-(1,4,8,11-tetraazacyclo-tetradecane)dicyanochromium (III).

Conventional red filter pattern is usually composed by a plurality of red pigments, but an enhancement in the transmittance thereof is limited. By contrast, in the red filter pattern 106a of the present embodiment, red dye replaces a portion of the red pigment so as to increase the transmittance of the color filter 100, thereby lowering the power consumption of the display apparatus 10. Nevertheless, if the red filter pattern 106a is irradiated by the light (such as being irradiated by the light from the backlight module), the red dye, as being exited by the light after it absorbs the light, would produce fluorescence. In general, fluorescence is a phenomenon of light emission not resulting from heat. A material of normal temperature, after being irradiated by an incident light having a certain wavelength (e.g., ultraviolet, X-rays, etc.) and absorbed the energy, enters into an emission, and would then immediately de-excite and emit an outgoing light (usually having a wavelength longer than the wavelength of the incident light, in the visible band). Once the incident light stops, the light emission phenomenon would also immediately disappear, and the outgoing light with the above characteristics is then referred as the fluorescence.

Figure 4:
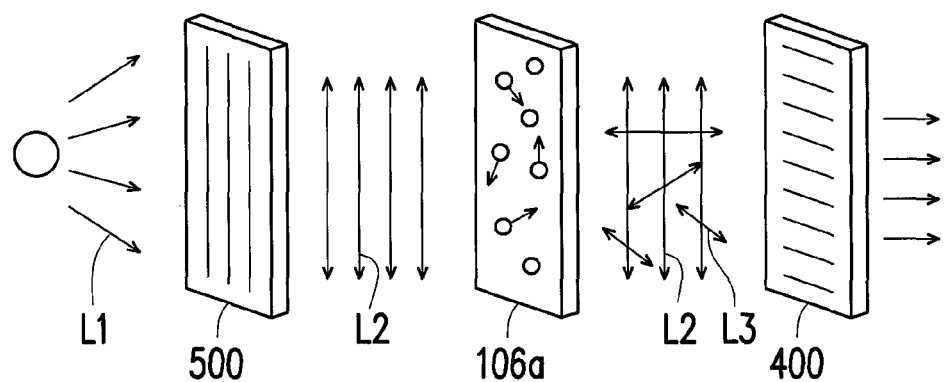
FIG. 4 is a schematic view illustrating a light of a backlight module passing through the red filter pattern.

FIG. 4 is a schematic view illustrating a light of a backlight module passing through the red filter pattern. For clear descriptions, some components (such as pixel array substrate 200, substrate 102, and etc.) are omitted in FIG. 4. Referring to FIG. 4, specifically, a light L1 is, for example, light emitted by the backlight module. When the incident light L1 irradiates on a second polarizer 500, a light L2 having a specific polarization direction may pass through the second polarizer 500. In other words, the light L2 is a light generated after the light L1 passes through the second polarizer 500 and is polarized by the second polarizer 500. Then, the light L2 would pass through the red filter pattern 106a, now, because the red dye would emit fluorescence L3 after absorbing the light, and the fluorescence L3 has a different polarization direction from the original light L2. Therefore, when the light L2 and fluorescence L3 pass through a first polarizer 400 and form the outgoing light L3, light leakage is apt to be occurred in dark state, thereby influencing the contrast ratio of the display screen.

In order to reduce the production of fluorescence due to the use of the red dye, the red filter pattern 106a of the present embodiment is added with the fluorescence quencher, which can be used to suppress the red dye from producing fluorescence after absorbing the light, and thereby result in a quenching phenomenon. As such, light leakage during the dark state may be significantly reduced, and thus ensures that the contrast ratio of the display screen maintains a favorable quality. It is to be noted that, the fluorescence quencher is, for example, a material that can suppress the red dye from producing fluorescence after absorbing the light, and since materials of the fluorescence quencher for suppressing different types of red dye may not be the same, the type of the corresponding fluorescence quencher may be determined in accordance to the type of red dye being used. In addition, when fabricating the filter pattern, if it is required to add materials other than the pigment to adjust the characteristic thereof, effects of these added materials on the transmittance of the filter pattern must be considered, so as whether the solubility of these added materials would cause side effect during the processing. Since the fluorescence quencher added in the present embodiment has a lighter color, and a wavelength range of this color is overlapped with a wavelength range of the red filter pattern, a transmittance characteristic peak of the red filter pattern would not be absorbed, and thus the transmittance would not be easily influenced. Moreover, since the fluorescence quencher has a favorable solubility to the red filter pattern, adverse side effects such as aggregation or precipitation are not likely to occur.

Figure 5:
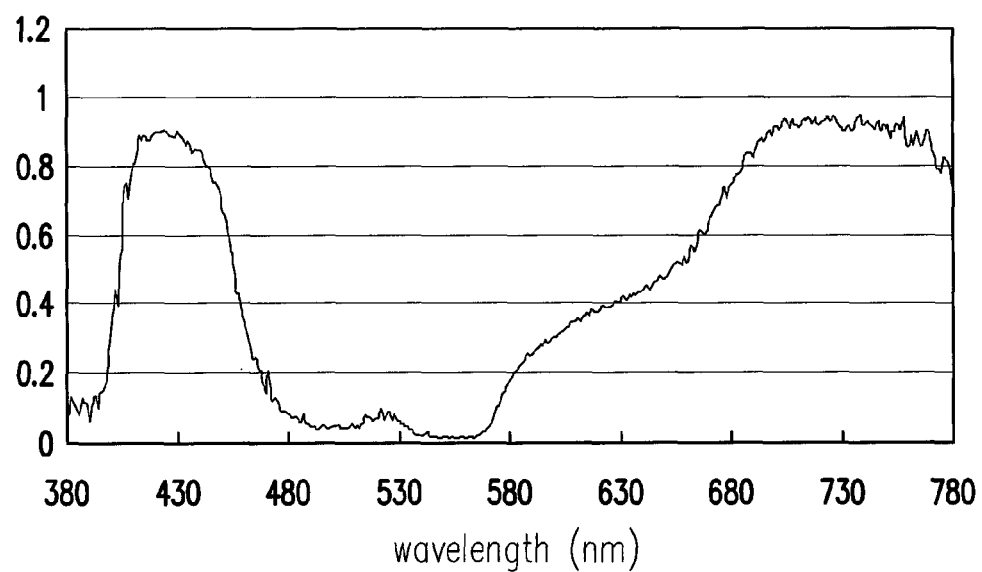
FIG. 5 illustrates a transmittance ratio of the bright and dark contrast spectrum of a color filter in an embodiment of the invention at a wavelength range from 380 nm to 780 nm.

Furthermore, after using the full-band light to irradiate the red filter pattern 106a to perform the bright full-band spectrum and the dark full-band spectrum measurements and setting the wavelength range between 380 nm to 780 nm to calculate transmittance between the bright transmittance spectrum and the dark transmittance spectrum under each respective wavelength, a transmittance ratio of the bright and dark contrast spectrum may be obtained. The bright full-band spectrum and the dark full-band spectrum measurements can be conducted by, for example, intensity measuring machine such as SRUL1. In detail, an upper polarizer and a lower polarizer may be configured on the machine. Subsequently, a sample, for example, a color filter, is placed between the upper polarizer and the lower polarizer. One of the polarizers is able to rotate automatically while the machine measures the change in spectrum and intensity. The brightest full-band spectrum is the spectrum measured when the upper and lower polarizers are parallel. The darkest full-band spectrum is obtained when the minimum value of intensity is measured. Theoretically, the upper and lower polarizers are arranged in cross or perpendicular manner when darkest full-band spectrum is obtained. However, the invention is not limited thereto. FIG. 5 illustrates a transmittance ratio of the bright and dark contrast spectrum of a color filter in an embodiment of the invention at a wavelength range from 380 nm to 780 nm. Referring to FIG. 5, according to the present embodiment, the transmittance ratio of the bright and dark contrast spectrum of the red filter pattern 106a has a first characteristic peak and a second characteristic peak. A wavelength range of the first characteristic peak is from 380 nm to 480 nm, and a wavelength range of the second characteristic peak is from 580 nm to 780 nm, wherein a sum of the transmittance ratio of the bright and dark contrast spectrum of the first characteristic peak is Y1, a sum of the transmittance ratio of the bright and dark contrast spectrum of the second characteristic peak is Y2, and Y2/Y1 is less than 3.9. In addition, the transmittance ratio of the bright and dark contrast spectrum of the red filter pattern 106a further has a third characteristic peak in a wavelength range from 610 nm to 650 nm. A sum of the transmittance ratio of the bright and dark contrast spectrum of the third characteristic peak is Y3, and 1<Y1/Y3<3.5. Moreover, the transmittance ratio of the bright and dark contrast spectrum at the wavelength of 650 nm is Y, and 0.2<Y<0.5. Herein, the sum of the transmittance ratio of the bright and dark contrast spectrum of the characteristic peak is calculated by performing integration on the peak curve within the desired range. In other words, the sum of the transmittance ratio of the bright and dark contrast spectrum of the characteristic peak is equal to the total area under the curve within a certain range.

Referring to FIG. 1, FIG. 2 and FIG. 3 again, a pixel array substrate 200 includes a substrate 202 and a pixel array layer 210. Specifically, the pixel array layer 210 includes a plurality of scan lines 212, a plurality of data lines 214 and a plurality of sub-pixels P. The scan lines 212 and the data lines 214 are staggered to define a plurality of sub-pixel regions. The sub-pixels P are arranged in arrays and are respectively disposed in one of the sub-pixel regions. Materials of the scan lines 212 and the data lines 214 include alloys, metals, metal nitrides, metal oxides, metal nitrogen oxides, transparent conductive materials, other conductive materials, or stacked layers of the above.

The sub-pixel P includes an active device 216 and a pixel electrode 218 electrically connected with the active device 216. The active device 216 may be a bottom gate thin film transistor or a top gate thin film transistor, which includes a gate, a channel, a source and a drain. Specifically, the active device 216 is electrically connected with the corresponding scan lines 212 and data lines 214. The gate is electrically connected with the scan lines 212, the source is electrically connected with the data lines 214, and the drain is electrically connected with the pixel electrode 218. The pixel electrode 218 may be constituted by transparent conductive material, such as indium tin oxide (ITO), indium zinc oxide (IZO), aluminum zinc oxide (AZO), or other suitable conductive materials, but not limited thereto. The structure and the connection relationship of the pixel array layer 210 are merely provided as an example for the purpose of description, and the invention is not limited thereto. According to the present embodiment, each of the sub-pixels P is disposed in correspondence to one of the color filter patterns (106a, 106b or 106c), and the two sandwich a portion of the display medium layer 300 to form a sub-pixel unit, whereby a plurality of sub-pixel units (such as a red sub-pixel unit, a blue sub-pixel unit and a green sub-pixel unit) may form a pixel unit.

Material of the display medium layer 300 may include non-self-luminous medium (such as: liquid crystal display medium, electrophoretic medium, electro-wetting medium or other suitable medium), self-luminous medium (such as: high molecular organic light-emitting medium, small molecule organic light emitting medium, inorganic light-emitting medium, or other suitable medium), other suitable display medium, or a combination thereof. Taking the liquid crystal display medium for an instance, it may be a positive type liquid crystal molecule, a negative type liquid crystal molecule, a blue phase liquid crystal molecule, a cholesteric liquid crystal molecule, or other suitable liquid crystal molecule.

According to different embodiments, the color filter 100 is, for example, an opposite substrate disposed opposite to the pixel array substrate having the active device, but the invention is not limited thereto. In other embodiment, the color filter 100 may also be an element substrate having a color filter layer 106 on an active device array substrate.

Moreover, the display apparatus 10 is, for example, a liquid crystal display apparatus, but the invention is not limited thereto. In other embodiments, the display panel 10 may also be an organic light emitting diode (OLED) display apparatus, wherein the color filter 100 may be a packaging cover plate of the OLED display apparatus.

Figure 6:
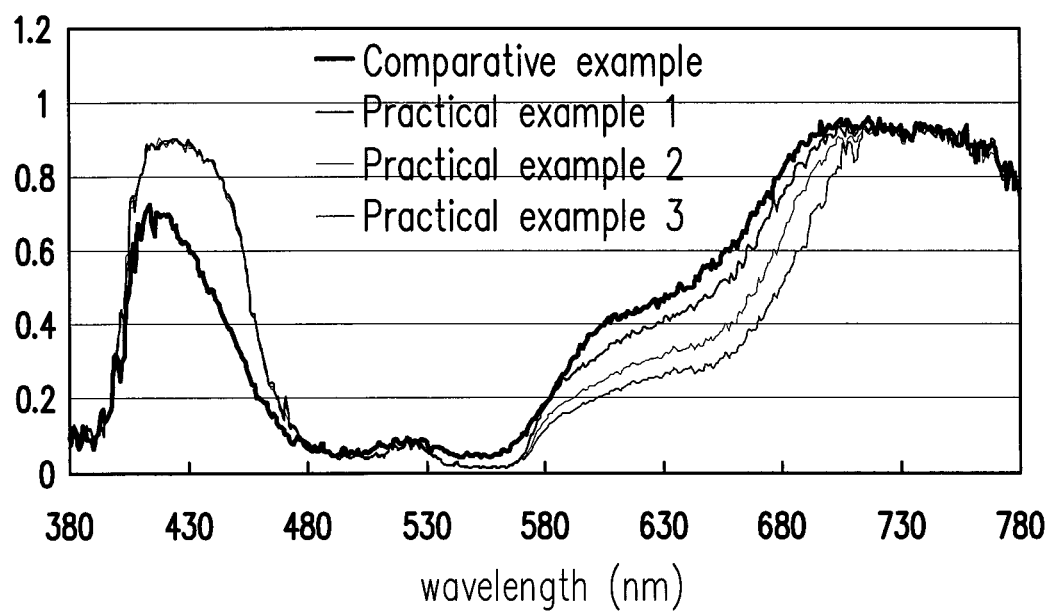
FIG. 6 illustrates a transmittance ratio of the bright and dark contrast spectrums of the color filters in practical examples 1 to 3 of the invention and in a comparative example at a wavelength range from 380 nm to 780 nm.

FIG. 6 illustrates a transmittance ratio of the bright and dark contrast spectrums of the color filters in practical examples 1 to 3 of the invention and in a comparative example at a wavelength range from 380 nm to 780 nm Table 1 shows red contrast ratio evaluation results from practical examples 1 to 3 of the invention. Color filters of the practical examples 1 to 3 and a comparative example include blue filter patterns, green filter patterns and red filter patterns. In the color filters of the practical examples 1 to 3, the red filter pattern includes a red pigment, a red dye and a fluorescence quencher, wherein the red pigment may, for example, be a pigment of Mode R254. Specifically, the red dye may, for example, be a xanthene class dye, and the fluorescence quencher may, for example, be a fluorescence quencher made of trivalent chromium complexes.

In the practical example 1, a weight ratio between the content of the red dye and the content of the fluorescence quencher is approximately 10:1. In the practical example 2, a weight ratio between the content of the red dye and the content of the fluorescence quencher is approximately 20:1. In the practical example 3, a weight ratio between the content of the red dye and the content of the fluorescence quencher is approximately 200:1. Taking the amount of fluorescence quencher added in the practical example 3 as the basis, the amount of the fluorescence quencher added in the practical example 2 is 10 times of the amount added in the practical example 3, and the amount of the fluorescence quencher added in the practical example 1 is 20 times of the amount added in the practical example 3. In the color filter of the comparative example, the red filter pattern only includes a red pigment, and does not include a red dye and a fluorescence quencher. The red pigment of the comparative example includes a pigment of Mode R254 and a pigment of Mode R177.

TABLE 1

|  | Contrast ratio of the red filter pattern | Contrast ratio of the color filter |
| --- | --- | --- |
| Practical example 1 | 30000 | 20300 |
| Practical example 2 | 22000 | 19580 |
| Practical example 3 | 11000 | 16500 |

It can be known from Table 1 and FIG. 5 that, higher the content of the fluorescence quencher in the red filter pattern, higher the contrast ratio of the red light (wavelength range of approximately 620 nm-750 nm). This is because that the fluorescence produced by the red dye is quenched by the fluorescence quencher, thereby lowering the light leaking during the dark state. Consequently, since dye molecules are smaller than pigment molecules, dye molecules have higher transmittance by the light, and thus the red filter pattern may maintain a high contrast ratio while being added with the red dye to increase its transmittance, so as to enhance the quality of the display screen.

In summary, the color filter of the invention includes the red filter pattern, and the red filter pattern includes the red dye and the fluorescence quencher. The addition of the red dye is facilitative in increasing the transmittance of the red filter pattern, the addition of the fluorescence quencher is facilitative in maintaining the contrast ratio of the red filter pattern, and thus the color filter of the invention is capable of lowering the power consumption of the display apparatus and enabling the display apparatus to maintain favorable quality.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A color filter, comprising:
a substrate; and
a red filter pattern disposed on the substrate, wherein the red filter pattern comprises a red dye and a fluorescence quencher, and the fluorescence quench comprises pentavalent chromium complexes, the red filter pattern has a bright and dark contrast spectrum, a transmittance ratio of the bright and dark contrast spectrum has a first characteristic peak and a second characteristic peak, a wavelength range of the first characteristic peak is from 380 nm to 480 nm, and a wavelength range of the second characteristic peak is from 580 nm to 780 nm, a sum of a transmittance ratio of the bright and dark contrast spectrum of the first characteristic peak is Y1, a sum of the transmittance ratio of the bright and dark contrast spectrum of the second characteristic peak is Y2, and Y2/Y1 is less than 3.9.

2. The color filter according to claim 1, wherein the red filter pattern further comprises a red pigment.

3. The color filter according to claim 2, wherein the red dye comprises a xanthene class dye or an acid red dye.

4. The color filter according to claim 2, wherein a content ratio between the red dye and the fluorescence quencher ranges from 5:1 to 10:1.

5. The color filter according to claim 1, wherein the transmittance ratio of the bright and dark contrast spectrum has a third characteristic peak at a wavelength range from 610 nm to 650 nm, a sum of the transmittance ratio of the bright and dark contrast spectrum of the third characteristic peak is Y3, and 1<Y1/Y3<3.5.

6. The color filter according to claim 1, wherein the transmittance ratio of the bright and dark contrast spectrum at a wavelength of 650 nm is Y, and 0.2<Y<0.5.

7. The color filter according to claim 1, wherein the red dye comprises a xanthene class dye or an acid red dye.

8. The color filter according to claim 1, wherein a content ratio between the red dye and the fluorescence quencher ranges from 5:1 to 10:1.

9. A color filter, comprising:
a substrate; and
a red filter pattern disposed on the substrate, wherein the red filter pattern has a bright and dark contrast spectrum, a transmittance ratio of the bright and dark contrast spectrum has a first characteristic peak and a second characteristic peak, a wavelength range of the first characteristic peak is from 380 nm to 480 nm, and a wavelength range of the second characteristic peak is from 580 nm to 780 nm, wherein a sum of the transmittance ratio of the bright and dark contrast spectrum of the first characteristic peak is Y1, a sum of the transmittance ratio of the bright and dark contrast spectrum of the second characteristic peak is Y2, and Y2/Y1 is less than 3.9.

10. The color filter as recited in according to claim 9, wherein the transmittance ratio of the bright and dark contrast spectrum has a third characteristic peak at a wavelength range from 610 nm to 650 nm, a sum of the transmittance ratio of the bright and dark contrast spectrum of the third characteristic peak is Y3, and 1<Y1/Y3<3.5.

11. The color filter according to claim 9, wherein the transmittance ratio of the bright and dark contrast spectrum at a wavelength of 650 nm is Y, and 0.2<Y<0.5.

\* \* \* \* \*